DELAYED CALL TELEPHONE SYSTEM

Filed Oct. 9, 1959 2 Sheets-Sheet 1

INVENTOR.
W. C. MILLER
BY Warren Whitford
ATTORNEY

United States Patent Office 3,110,773
Patented Nov. 12, 1963

3,110,773

DELAYED CALL TELEPHONE SYSTEM

William C. Miller, Glen Ellyn, Ill., assignor to International Telephone and Telegraph Corporation, New York, N.Y., a corporation of Maryland Filed Oct. 9, 1959, Ser. No. 845,379
23 Claims. (Cl. 179—41)

This invention relates to telephone systems and more particularly to delayed call telephone systems.

The number of long distance voice channels which extend between any two terminals is usually determined by the grade of service that is required between such terminals. Therefore, all trunks busy signals are normally encountered at the same rate without regard to the absolute number of either calls or trunks that may be extended between any two points in a long distance system. The relatively few calls which must be rejected when all trunks are busy are unimportant since additional circuits are almost immediately available owing to the termination of calls which are in progress when the all busy signal is encountered. On the other hand, in some telephone systems, it is not possible to provide the additional channels which are required to give the desired grade of service; therefore, it is necessary to provide means for queuing calls so that high priority calls with the earlies filing time may be completed first. Low priority calls are also completed according to filing time; however, they must wait until all higher priority calls have been served.

A telephone system having only a limited number of channels is illustrated by a twenty-four hour satellite system wherein artificial satellites are placed in orbit at an altitude above the earth which is such that the satellite is stationary relative to the earth's surface, i.e., the satellite orbits at the exact speed that the earth rotates. The satellites are provided with receiving and transmitting equipment which may be used to repeat telephone messages between various points on the earth's surface.

An object of this invention is to provide for new and improved handling of delayed calls.

Another object of this invention is to provide for completing delayed calls on a basis of priority and filing time.

Yet another object of this invention is to adapt a conventional telephone system having a usual number of voice channels to work in connection with a limited service system having a restricted number of voice channels.

Still another object of this invention is to provide for interconnecting independent one-way channels to give two-way service for the duration of a call.

In accordance with this invention, conventional telephone systems are connected to communication centers which are scattered over the surface of the earth. Each center communicates with every other center via one-way radio link voice channels which are received by and rebroadcast from an orbiting earth satellite. Equipment at each communication or ground center stores data relative to every call extended thereto from an associated conventional telephone system, such data including priority of call and time of filing. When any radio link voice channel becomes idle, equipment at an associated communication or ground center selects and reads-out data stored thereat which relates to the highest priority call having the oldest filing time. The read-out data is transmitted over the idle channel to every other ground center where it is analyzed. Responsive thereto, equipment in the called ground center stores the data relative to such incoming call as it is received. Nothing further happens relative to the call being described until a voice channel becomes idle at the called center. Thereafter, all data stored at the called center is scanned to select both the locally originated call and the incoming call which have the highest priority and oldest filing time in their respective categories. The two selected calls are compared and the idle channel at the called exchange is assigned to serve the oldest and highest priority call of the two. If the incoming call is not selected, the voice channel extending from the calling to the called center remains in an awaiting condition until the call which it serves is selected at the called center. The term "awaiting condition" is used herein to describe the status of the voice channel after a call is extended from a calling to a called center and before the called center has assigned a transmit channel for completing a return path to the calling center.

The above mentioned and other objects of this invention together with the manner of obtaining them will become more apparent and the invention itself will be best understood by making reference to the following description of an embodiment of the invention taken in conjunction with the accompanying drawings in which:

FIG. 1 shows a twenty-four hour satellite system such as that contemplated by the subject invention;

FIGS. 2 and 3, when properly joined, disclose one ground or communication center terminal of a voice channel for use in such system; and FIG. 4 shows the manner in which FIGS. 2 and 3 should be joined to provide a complete and understandable circuit.

Where possible, simple terms are used and specific items are described hereinafter to facilitate an understanding of the invention; however, it should be understood that the use of such terms and the description of such items are not to act in any manner as a disclaimer of the full range of equivalents which is normally given under established rules of patent law. For example, the invention is described in connection with limited service equipment including repeater stations in satellites orbiting the earth; whereas, the terminal may be used in connection with any limited service equipment as during periods of national emergency when it is necessary to use an insufficient number of land lines between any two given points. Moreover, calls are described as being completed on the basis of time of filing and priority of call; whereas, calls may be queued on a different basis—for example, preference may be given to certain geographical areas. Quite obviously, other examples could be selected to illustrate the manner in which terms that have been used and items which have been described are entitled to a wide range of equivalents.

*Brief Description*

The subject invention contemplates a limited service telephone system having relatively few voice channels which interconnect conventional telephone systems having relatively unlimited facilities. The specific system that is described is one wherein a plurality of intermediate stations are on satellites that orbit the earth at an altitude which causes the satellite to remain stationary over a particular point on the earth's surface. As shown in FIG. 1, the earth 80 has three satellites 90, 91 and 92 each including an intermediate or relay station. On the earth's surface, there are many ground or communication centers as indicated generally by antennas 81–86. Each ground station or communication center is adapted to transmit on individually assigned voice channels and to receive all except its own voice channels. For example, if there are eight ground or communication centers and each has twelve individually assigned transmit channels, there are a total of ninty-six channels in the system. A first ground center may transmit on channels 1–12 and receive on channels 13–96, a second ground center may transmit on channels 13–24, and receive on channels 1–12 and 25–96, etc.

As calls are extended through conventional local telephone systems (not shown in FIG. 1), equipment at each ground or communication center (item 81, for example) receives and stores subscriber transmitted data relative to the priority of call, calling, and called directory numbers. The ground center equipment may then insert the time and day when the call is placed together with any other pertinent filing information. Each time that a transmit channel becomes idle, equipment at the corresponding ground center scans all locally stored data, selects the highest priority call having the oldest filing time and read-out data pertaining thereto. Thereafter, at least some of thet read-out data is transmitted to each ground center through the idle voice channel, with an intermediate station on a satellite functioning as a relay. Since each ground center receives data relative to calls which are queued at other ground centers and receives data relative to calls originated from a local telephone system, a comparison is made between the locally originated data and the distantly originated data to find the call among all of these calls which is of highest priority and oldest filing time. The read-out of the data for comparison purposes is a non-destructive read-out so that the data of those calls which are not selected as having preference remains in a semi-permanent storage for subsequent comparisons. The data relative to the call which is selected as having preference is deleted from the semi-permanent storage either upon completion or upon switch through of the call, i.e., read-out for comparison purposes is temporary and is deleted upon completion of the comparison function. In this manner, each ground station gives preference in assigning idle voice channels to the call of highest priority and oldest filing time of all calls in the complete system which are awaiting switching by that ground station.

For example, let it be assumed that a call at ground station 84 has the highest priority with the earliest filing time and further that it is destined for a telephone located at ground station 86. The communication channel extends from ground station 84 through satellite 90, ground sation 85, satellite 92, and ground station 86 where the call is completed when a transmit channel at station 86 becomes idle. The data relative to a non-preferred call which was read-out at ground station 86 is cancelled but the same data remains stored so that the read-out may be repeated when the next channel becomes idle.

*Detailed Description*

Figures 1, 2:
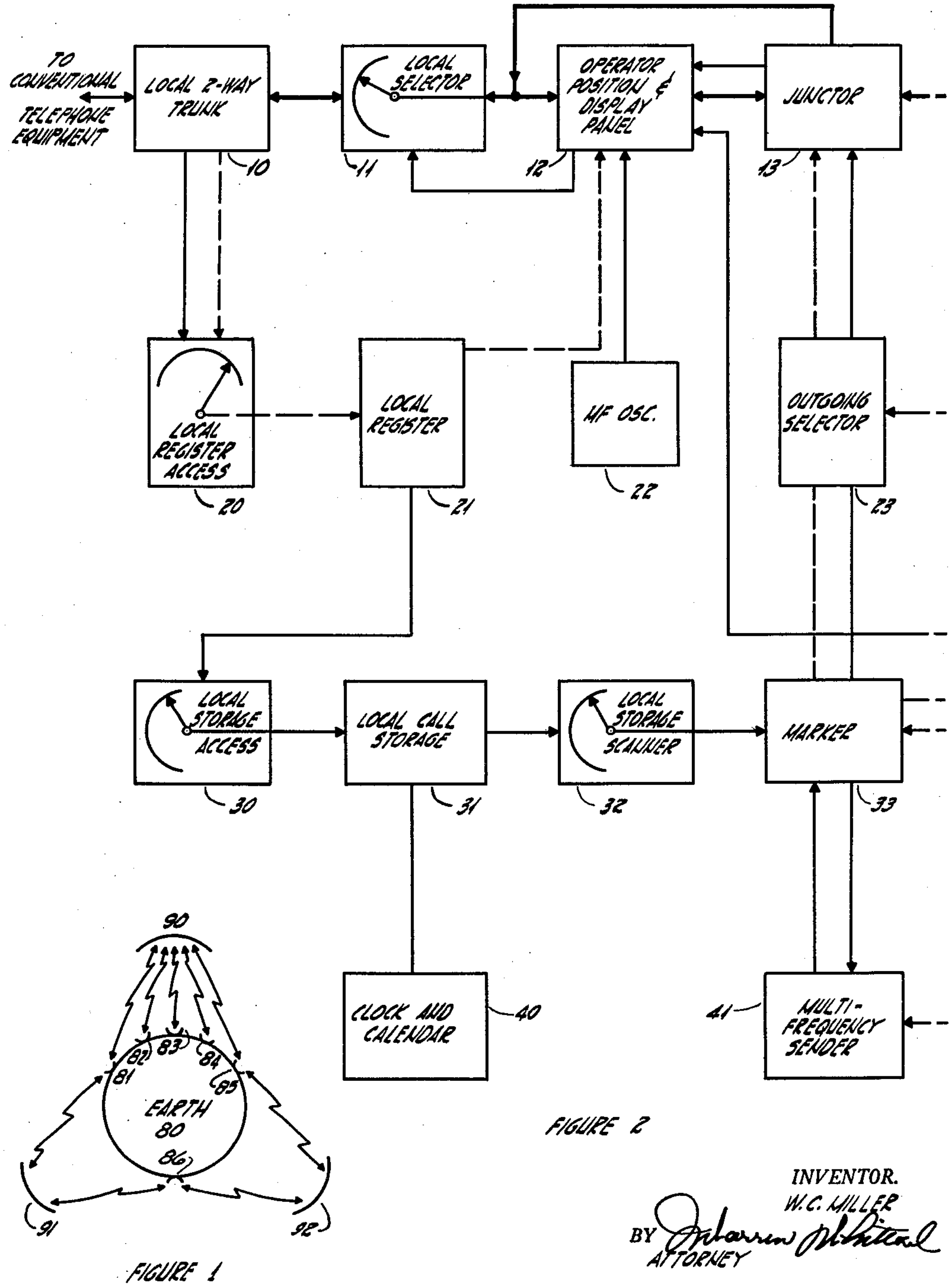
Figures 3, 4:
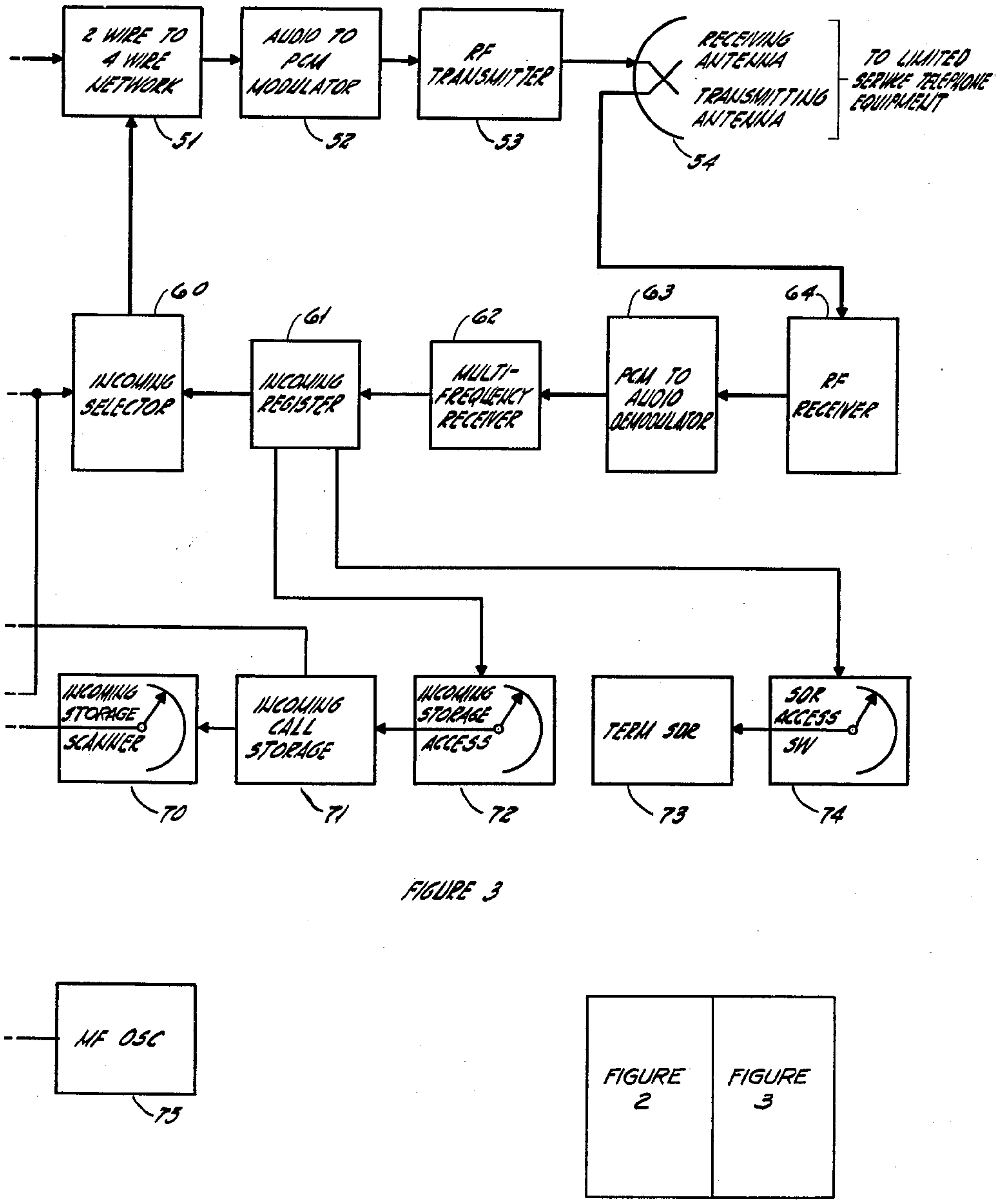

Next reference is made generally to FIGS. 2 and 3 which show one two-way terminal at a ground center that transmits to and receives from an orbiting satellite via a radio link depicted generally by antenna 54. Each of the eight ground centers has individually assigned subcarrier frequencies which provide transmit channels to the satellite. The subcarriers are linearly added at the satellite to provide a frequency multiplexed signal that is amplified, shifted to new frequencies and rebroadcast to all ground centers in the same hemisphere. Thus, each rebroadcast voice channel is available for demodulation at every ground station which is in the hemisphere that is covered by the orbiting satellite. In order to derive maximum traffic handling efficiency from the system described herein, telephone calls are handled on a delayed basis. Therefore, after all voice channels are busy, calls accumulate at each switching center. A manual operator position 12 included in the system handles person-to-person calls and provides for overriding stored data, as necessary.

*Local data storage.*—Referring specifically to FIG. 2, conventional telephone equipment has access to the two-way terminal via a trunk depicted by a double ended arrow shown near the left-hand portion of local two-way trunk 10. Locally originated calls arriving at the ground center are extended from the trunk to a local register 21 via access switch 20. Local register 21 receives and temporarily stores data arriving in the form of impulses which identify the priority of the call, the called telephone number, and the calling telephone number. In addition, register 21 connects to the display panel and operator position 12 so that similar information may be displayed by means of lamps situated thereat. The operator may supervise person-to-person calls, may challenge to prove priority of a call, and may key priority indicating or other signals into local registers 21, as required. Usually, the operator tells the calling party to remain near a telephone so that the call may be handled on a delay basis unless there is an extremely high priority in which case the operator may take down an existing lower priority connection to make a channel immediately available for a higher priority call.

At the same time that information is being transmitted from register 21 to the operator position, an access switch 30 connects a semi-permanent storage device 31 to local register 21 whereupon information that was received when the call was placed is semi-permanently filed in suitable storage or memory circuits. Alternatively, the entire digital information that is required to complete a call, may be keyed-in by an operator at position 12. Thereafter, local storage circuit 31 calls in clock and calendar 40 for filing data such as the time and day on which a call is placed. After the transfer of data, local register 21 releases and access switch 20 is stepped to serve the trunk carrying the next incoming call.

Responsive to instructions from an operator at position 12, the calling party hangs-up to release the conventional telephone equipment, or if the call is not be delayed the calling party may remain on the line.

As additional calls come in, local register 21 receives subscriber transmitted data which is transferred to local call storage circuit 31.

*Read-out.*—Means is provided for non-destructively reading out information which is stored in circuit 31, i.e., the read-out does not cancel the storage of data in circuit 31. More particularly, since information is stored in circuit 31, a signal is extended by any suitable means (not shown) to marker circuit 33 which makes a test to determine whether an idle communication channel is or is not available. Eventually, an idle channel is found and marker 33 transmits a signal to local storage scanner 32. Responsive thereto, scanner 32 hunts over the memory circuits of local call storage 31 according to priority and filing time thereby selecting the oldest call having the highest priority. Data relative to such a call is transmitted over antenna 54 as described below. While any suitable data may be transmitted, the present system contemplates the transmission of a called area code, priority and filing time.

It is also possible that a two-way terminal at some other ground center has pending calls. Therefore, equipment at such other center scans similar memory circuits, reads-out, and transmits, over a voice channel, data relative to the highest priority call having the oldest filing time thereat. Information received over antenna 54 from all other ground centers is transmitted through receiver 64, demoduator 63, receiver 62 and fed into temporary storage at incoming register 61. An access switch 72 completes a circuit for registering the received information in an incoming call storage 71. Incoming control scanner 70 scans all such information stored in incoming call storage 71, thus selecting the oldest call with the highest priority which was filed at another ground center. Marker 33 makes a comparison of the filing time and priority of both the selected local call and the selected incoming call, to determine which is to be given preference and idle transmit channels are assigned in accordance therewith.

It should be noted that items 30, 31, 71 and 72 may be eliminated if registers 21 and 61 are provided on a one-per-channel basis in which case scanners 32 and 70 have direct access to items 21 and 61, respectively.

*Local call.*—Next, it is assumed that the calling ground center of FIGS. 2 and 3 seizes an idle voice channel either because only a local call is awaiting completion or because the local call has the earlies filing time and highest priority. Therefore, marker 33 selects the local call as that which is to take command of the idle channel and transmits signals which cause outgoing selector 23 to seize junctor 13 which is individually associated with the idle channel. Responsive thereto, junctor 13 provides a splitting function, i.e. separates tip, ring and sleeve conductors extending to the left from those extending to the right of junctor 13. A circuit may now be traced from the transmit side of antenna 54 through transmitter 53, modulator 52, two-wire to four-wire network 51, junctor 13, and outgoing selector 23 to marker 33. The side of the line extending through local two-way trunk circuit 10 is terminated in junctor 13 to prevent singing.

Marker 33 is provided with means for causing sender 41 to transmit data which requests the called ground center to assign an idle receiving channel. That is, multi-frequency sender 41, which is driven from oscillator 75, reads-out the data or information that is selected by marker 33. This information is converted into a pulse code by modulator 52 for transmission through transmitter 53 and antenna 54. After all digital information (i.e., called area code number, filing and priority information) making-up the request for assignment of idle channel has been sent, junctor 13 connects operator position 12 to multi-frequency sender 41 and applies idle termination to the transmit channel extending to antenna 54. Multi-frequency sender 41 again reads-out information relative to the pending call to cause a lamp bank at operator position 12 to display such information for the duration of the call. Thus, the operator at position 12 has data displayed to her which identifies every call that is in progress. After multi-frequency sender 41 has finished the second read-out, it transmits a signal which causes junctor 13 to switch through thereby interconnecting operator position 12 and antenna 54. Thereafter, marker 33, local storage scanner 32, incoming control scanner 70, outgoing selector 23, and multi-frequency sender 41 release.

Nothing further occurs in the originating ground center until an answer to the request for receiving channel assignment is received from the called ground center.

*Request for channel assignment.*—Means is provided at the called ground center to register the request for channel assignment. More specifically, returning to the point where multi-frequency sender 41 in the originating ground center first began to transmitting signals over the outgoing voice channel, the modulated signals are carried via a radio link to the orbiting satellite which covers the ground center that includes equipment shown in FIGS. 2 and 3. All seven of the other switching centers associated with this particular satellite receive a rebroadcast of the modulated carrier.

For the immediately following portion of this description, it is assumed that the circuits of FIGS. 2 and 3 are located at the called ground center. Signals are transmitted from the orbiting satellite to the receive side of antenna 54, receiver 64, demodulator 63, and receiver 62 to incoming register 61 which temporarily stores the received data. As digit signals are received from the calling end, they are stored in incoming register 61 in chronological order. Since each ground center has its own area code or exchange designation, incoming register 61 determines by a first two or three digits whether the call is destined for the exchange in which it is located. If the area code indicates that the call is for some other exchange, the received data is cancelled in register 61 and no further information is stored. On the other hand, if the call is for the exchange where incoming register 61 is located, the remainder of the digit pulses are stored. Thereafter, incoming control access switch 72 seizes register 61 and completes a path so that the data may be semi-permanently stored in incoming call storage 71. As pointed out above, items 71 and 72 may be eliminated and scanner 70 may be given direct access to register 61, as required. If a transmit channel at the called center is idle, a reply is sent to the calling center thus signalling satisfactory reception of all information and assignment of a receiving channel. Thereafter, the call may be completed in the manner explained below.

*High priority call.*—As explained above, each ground communication center has individually assigned transmit channels and receives all other channels. Therefore, when a calling center seizes an idle channel to extend a call, there is no assurance that an idle channel is available at the called exchange. The calling center merely transmits data relative to a call as explained above and then waits until an idle transmit channel is available at the called exchange. Normally, the traffic pattern may be accommodated so that the calling center does not have to wait too long before a called center transmit channel becomes idle and the call is completed. Some calls may have such a low priority that the awaiting channel is released responsive to the receipt of a high priority call before an idle channel is available at the called center. On the other hand, some calls may have such a high priority that they should not be kept waiting; rather, existing calls should be released, thereby making transmit channels available immediately. In still other cases, an operator may be given control over the assignment of channels since full information relative to all calls in progress is displayed on her board.

If an incoming call has such a high priority that it warrants taking down an existing connection, incoming call storage circuit 71 responds to priority data by extending a signal to operator position 12 where a suitable control lamp lights. Upon seeing the lamp, the operator interrupts a low priority call which is in progress and tells the conversing parties to conclude their conversation quickly or be cut-off. Thereafter, a timing device measures a maximum length of time whereupon the operator takes down the connection, thus making a channel available for the high priority call.

When a transmit channel at the called center becomes available, marker 33 is connected to incoming call storage 71 via incoming control scanner 70 and to local call storage 31 via local storage scanner 32. As previously described, local storage scanner 32 scans the local call storage circuit 31 to determine which call has the earliest filing time and the highest priority. Simultaneously therewith incoming control scanner 70 determines which incoming call is the oldest with the highest priority. Thereafter, marker 33 compares the selected information stored in circuits 31 and 71 and selects the call which should be completed first by assigning the idle transmit channel.

*Completion of communication connection.*—It is assumed that the call which is identified by the data received from a calling center as described above is selected by marker 33. Responsive thereto, marker 33 at the called center sets incoming selector 60 to interconnect the idle transmitting channel and the awaiting receive channel. Incoming register 61 applies a ground marking to control and hold incoming selector 60 at this time. It should be noted that the transmit and receive channels are two, normally non-associated, one-way circuits which are now combined at the called end by the action of selector 60 to provide a single, two-way circuit for the duration of the call that is being described. Thereafter, selector 60 will release and the transmit and receive channels will be disassociated and ready to be assigned to serve the next call or calls.

Next, marker 33 operates outgoing selector 23 to seize junctor 13 associated with the idle transmit channel. Thereafter, junctor 13 performs a splitting function, as described above, by connecting transmitter 53 to marker 33. Multi-frequency sender 41 reads marker 33 and transmits digit information over the channel including items 23, 13, 51, 52, 53, and 54, thereby identifying the selected transmitting channel to the distant ground center. Thereafter, sender 41 transmits an end-of-sending signal and releases.

As previously described, the radio message transmitted from antenna 54 to the orbiting satellite is repeated and transmitted to all other ground centers which are covered by the satellite. Again, incoming register 61 at each of the other ground centers identifies each call by an office or area code and only the register at the proper ground center continues functioning. Responsive to the receipt of such repeated message, marker 33 which is located at the originating center sets incoming selector 60 in accordance with the received transmitting channel identification thereby interconnecting a receiving and transmitting channel. It is noted that the two, one-way channels are now combined at the calling end by the action of selector 60 to provide a single two-way channel for the duration of a call. A lamp lights at operator position 12 to indicate that channel switching is completed and therefore a call may be completed.

Since it is assumed that the call is a delayed call, the operator must proceed to reestablish connection with the calling party via conventional switching equipment. Therefore, the operator utilizes a local cord circuit (not shown) at position 12 to start local selector 11 hunting for an idle two-way trunk circuit 10. Thereupon, trunk circuit 10 extends a seizure signal to conventional telephone switching equipment and the operator keys a digital code corresponding to the telephone number of the calling party. A local telephone system extends the call to the calling subscriber in any well known manner.

The calling party is instructed by the operator to remain on the line until the call may be completed. Then, the operator keys the called directory number and digit signals are transmitted over the radio link extending from antenna 54 to the satellite and the called ground center where the data is stored in register 61 which called in sender 73. In greater detail, the data which was originally sent to the called center included only an area code, priority and filing time, all as described above. When the two-way channel association is completed, the operator keys the directory number which sets the local switch train of conventional equipment. These digits are stored in register 61 at the called end. Responsive to completion of such storage (or to any other convenient signal) a by-path circuit is completed from junctor 13 to local selector 11 which searches for and seizes an idle "Local 2-Way Trunk 10" (operator position 12 is not required at the called end). Sender access switch 74 also attaches sender 73 to register 61. Thereafter, conventional local telephone equipment responds to seizure from selector 11 by returning a start signal. Next, sender 73 sends switch control signals in accordance with data stored in register 61 and releases. Responsive to the operation of sender 73, automatic telephone equipment is sent to seize and signal the line extending to the called subscriber station. Incoming register 61 at the called center controls the holding of the switch train thereat.

The operator at the originating switching center has complete control of the call at this time and remains on the line either until the called party answers or until busy tone is received. All data relative to the call is cancelled from items 31, 61 and 71 responsive to switch through of the talking circuit from the calling to the called subscribers; however, data remains on the display panel of item 12 until the call is terminated, thereby giving the operator supervision of the call for the duration thereof. Disconnect supervision by the calling party at the end of conversation signals the operator who takes down the connection.

While the principles of the invention have been described above in connection with specific apparatus, it is to be clearly understood that this description is made only by way of example and not as a limitation on the scope of the invention.

I claim:

1. A delayed call telephone system comprising means including at least one voice channel extending between distant points, means at each of said points for locally storing data relative to calls which are incoming locally from conventional telephone equipment to said point, means at each of said points for non-destructively reading-out said locally stored data relative to selected ones of said incoming local calls, said means for non-destructively reading-out being responsive to an idle condition on said voice channel, means at each of said points for transmitting said read-out data over said voice channel to other of said points, means at each of said other points for comparing said data received over said voice channel and said data that is read-out locally, and means responsive to said comparing means for giving preference to one of said calls.

2. The telephone system of claim 1 and at least one artificial earth satellite in an orbit having an altitude above the earth such that said satellite is substantially stationary relative to the surface of the earth, and means carried by said satellite for completing said voice channel.

3. The telephone system of claim 1 wherein said stored data includes information relative to priority and filing time of each of said calls, and said means for reading-out said stored data comprises means for scanning all of said stored data to select call having the highest priority and earliest filing time.

4. The telephone system of claim 3 wherein said comparing means comprises means for comparing data relative to said priority and filing time of said data received over said voice channel and of said locally read-out data, and said means for giving preference to said one call comprises means for selecting the call having the highest priority and the oldest filing time.

5. The telephone system of claim 4 and at least one artificial earth satellite in an orbit having an altitude above the earth such that said satellite is substantially stationary relative to the surface of the earth, and means carried by said satellite for completing said voice channel.

6. The telephone system of claim 4 and means for cancelling said read-out data relative to calls which are not given preference.

7. The telephone system of claim 1 and means for cancelling said read-out data relative to calls which are not given preference.

8. The telephone system of claim 7 and at least one artifical earth satellite in an orbit having a altitude above the earth such that said satellite is substantially stationary relative to the surface of the earth, and means carried by said satellite for completing said voice channel.

9. In a telephone system including conventional telephone equipment, limited service telephone equipment, and means for interconnecting said conventional and said limited service telephone equipment, the combination therewith comprising: means for storing data relative to calls extended through said conventional telephone equipment to said limited service equipment according to time of filing and priority of call, means responsive to availability of said limited service equipment for selecting that of said stored data which relates to the call having the highest priority and oldest filing time, and means responsive to selection of said data for completing the one of said calls which is identified thereby.

10. The telephone system of claim 9 wherein said data selecting means comprises means for comparing said priority and filing time of data received over said limited service equipment and of data received from said conventional equipment, said selected data being that relative to the call having the highest priority and the oldest filing time.

11. The telephone system of claim 10 means for providing non-destructive read-out of said stored data, and means for cancelling non-selected locally read-out data, whereby the same data may be read-out again at a later time when additional limited service equipment is available.

12. The telephone system of claim 9 and at least one artificial earth satellite in an orbit having an altitude above the earth such that said satellite is substantially stationary relative to the surface of the earth, and means including said satellite for completing voice channels through said limited service equipment.

13. The telephone system of claim 9 wherein said means for storing data comprises means for locally and temporarily storing data as received from said conventional telephone equipment, means responsive to said last named means for repeating said temporarily stored data into semi-permanent local call storage equipment, and means including a clock and calendar circuit for inserting time of filing data in said semi-permanent storage.

14. The telephone system of claim 13 and means including an operator display panel, and means for displaying information on said panel corresponding to said stored data.

15. The telephone system of claim 14 and means for maintaining said display of said information for the duration of said call, whereby said operator has supervision over all calls in progress.

16. The telephone system of claim 9 wherein said data selecting means comprises means for non-destructively reading-out stored data relative to calls through first of said conventional telephone equipment, and means for transmitting said read-out data to other of said conventional equipment via said limited service telephone equipment.

17. The telephone system of claim 16 and means associated with said first conventional telephone equipment for receiving and storing other of said data transmitted thereto via said limited service equipment from said other conventional telephone equipment.

18. The telephone system of claim 17 and means responsive to said storage of a first portion of said other data for identifying calls which may be completed through said first conventional equipment, means responsive to said identification of calls which may be completed through said first conventional equipment for completing the storage of all said other data, and means responsive to an identification of calls which may not be completed through said first conventional equipment for cancelling said storage of said first portion of said other data and for rejecting the remainder of said other data.

19. The telephone system of claim 18 and means for selecting and reading-out certain of said other data which relates to the highest priority and oldest call at said other conventional equipment, means for comparing said certain data with said non-destructively read-out data, and means responsive to said last named means for assigning said limited service telephone equipment to serve the call having the highest priority and the earliest filing time.

20. A telephone system comprising a plurality of communication centers and a limited number of intermediate stations, a plurality one-way communication channels, means whereby each of said centers has a group of said channels individually assigned thereto for transmission of information from said each center through at least one of said intermediate stations to other of said centers, means at a calling one of said centers for seizing and idle first one of said channels, means responsive to said channel seizure for transmitting a request signal over said first channels to a called one of said centers, means for holding said first channel in an awaiting condition until a second one of said channels is idle for transmitting from said called center, means responsive to said request signal for seizing said second channel, and means for thereafter completing a two-way communication connection between said calling and called centers via said first and second channels and at least one of said intermediate stations.

21. The telephone system of claim 20 and at least one artificial earth satellite having a twenty-four hour orbit, and means whereby said intermediate station is carried by said orbiting satellite.

22. The telephone system of claim 21 wherein said request signal transmitting means comprises means for indicating priority and filing time of a telephone call and said connection completing means includes means for selecting the call having the highest priority and earliest filing time.

23. The telephone system of claim 22 and means for releasing said awaiting channel responsive to the receipt of a call having a higher priority.

References Cited in the file of this patent

UNITED STATES PATENTS

| | | |
|---|---|---|
| 2,686,843 | Shafer | Aug. 17, 1954 |
| 2,757,240 | Gatzert | July 31, 1956 |
| 2,923,777 | Schneider | Feb. 2, 1960 |
| 2,935,627 | Schneider | May 3, 1960 |